July 12, 1938. O. J. HORGER 2,123,831
WHEEL AND AXLE ASSEMBLY AND PROCESS OF PRODUCING SAME
Filed Sept. 4, 1937
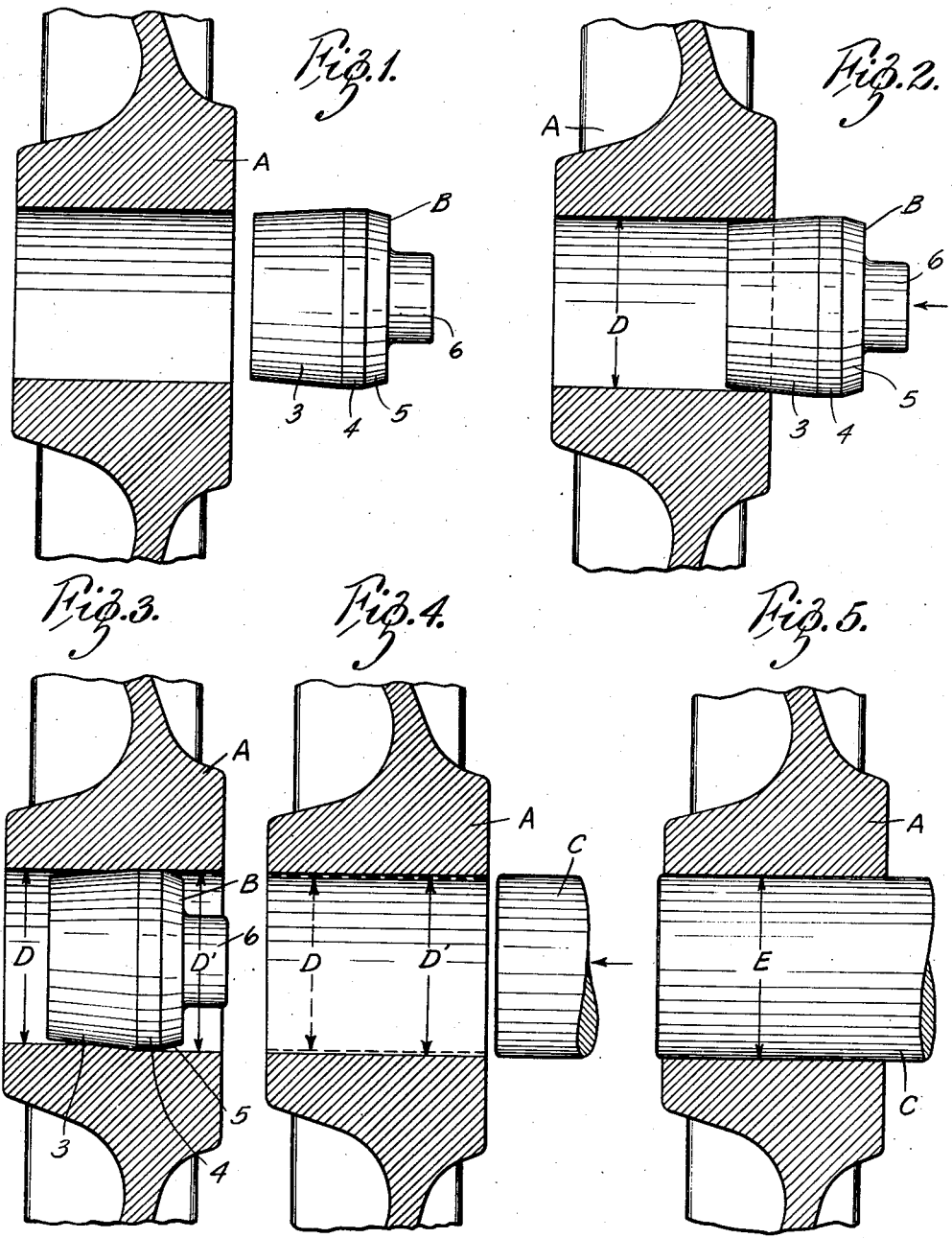
INVENTOR
Oscar J. Horger,
by Carr, Carr & Gownely,
HIS ATTORNEYS Patented July 12, 1938

2,123,831

UNITED STATES PATENT OFFICE 2,123,831

WHEEL AND AXLE ASSEMBLY AND PROCESS OF PRODUCING SAME

Oscar J. Horger, Canton, Ohio, assignor to The Timken Roller Bearing Company, Canton, Ohio, a corporation of Ohio Application September 4, 1937, Serial No. 162,506

4 Claims. (Cl. 29—168)

My invention relates to press-fitting of wheels on axles, and especially to press-fitting locomotive driving wheels on their axles. It has long been common practice to mount locomotive driving wheels on their axles with a press-fit and until recent years the wheels so mounted seldom became loose under the conditions prevailing prior thereto. In recent years, however, the conditions have become much more severe, due mainly to the demand for higher speed, with the result that the loosening of a locomotive wheel on its axle is much more common than heretofore. It has been found that an excess of fitting pressure is likely to stress the wheel metal near the bore beyond its elastic limit and thereby loosen its grip on the axle. The principal object of the present invention is to mount the wheel with a firmer grip on the axle than has heretofore been practicable. The invention consists principally in pre-stressing the wheel metal next to the bore so as to raise its elastic limit prior to press-fitting the wheel on the axle.

In the accompanying drawing, wherein like numerals refer to like parts wherever they occur, Fig. 1 represents a cross-section on the hub portion of a wheel, together with a plug for stressing the metal next to the bore of the hub, the taper of the plug being somewhat exaggerated for purposes of illustration, Fig. 2 is similar to Fig. 1 with the tapered plug entered part way into the bore, Fig. 3 is a similar view with the plug forced part way through the bore, Fig. 4 illustrates the pre-stressed hub with the end of the axle about to be pressed into the bore thereof; and Fig. 5 shows the wheel and axle assembled.

The ordinary locomotive wheel is made of cast steel of a relatively coarse texture and with a relatively low yield point; and it is common practice to force such a wheel onto an axle of slightly larger diameter than the diameter of the wheel bore. If the difference in the two diameters is such that the wheel can be mounted without stressing its metal beyond the yield point of its metal, the wheel effects and maintains a grip on the axle proportionate to the forcing pressure; but if the wheel metal is stressed beyond its yield point, its grip is loosened or, at least, not increased proportionately to the pressure used in forcing the wheel into place.

According to the present invention, my wheel A is made of the coarse texture steel commonly used for locomotive wheels but the metal surrounding the wheel bore is pre-stressed prior to being press-fitted on its axle. For this purpose, a plug B of circular section and slight taper is forced through the bore of the wheel. This operation of expanding the bore may be effected with a single tapered plug or with a series of successively larger tapered plugs, the pressure being conveniently applied to the plug by a suitable hydraulic press or the like.

The particular plug B illustrated in the drawing comprises a broad slightly conical portion 3 which tapers toward the front end and whose small diameter is enough less than the original diameter D of the bore to permit easy entry into said bore, and whose large diameter is somewhat greater than the original diameter of the bore. Said plug also comprises a cylindrical portion 4 next to the base of said conical portion and of even diameter therewith, and a conical portion 5 whose base is next to said cylindrical portion and of even diameter therewith and which tapers toward the rear end of the plug. The plug has a shank 6 at its rear end suitable for cooperation with a ram or press. While I prefer to use the particular plug shown, its design is obviously subject to modification.

The effect of forcing the tapered plug through the bore of the wheel is to stress the metal next to the bore beyond its elastic limit and produce a permanent deformation or set of the metal so stressed. Thus the bore of the wheel is permanently enlarged from its initial diameter D to the diameter D' of the prestressed wheel. In this operation, the initially coarse grains of the wheel metal next to the bore are broken down into finer grains which unite into a mass whose elastic limit and yield point are much higher than those of the original wheel material.

After the wheel has been subjected to the action of the tapered plug or plugs to raise the yield point of the portion of the metal next to the bore, the wheel is press-fitted on an axle which is of slightly larger diameter E than the diameter D' of the bore of the prestressed wheel. Due to the higher yield point of the prestressed metal, the prestressed wheel will maintain its grip on the axle under a considerably higher pressure than that at which the original metal would yield. Accordingly, a much higher pressure may be effectively used for forcing the wheel onto the axle than has heretofore been practicable, and the wheel will fit more tightly on the axle.

While my invention is particularly applicable to the heavy press-fitting of locomotive wheels on its axles it is obviously applicable to other wheel and axle assemblies and to the mounting of collars on shafts and like arrangements.

What I claim is:

1. The process which consists in taking a metal wheel with a bore in the hub thereof, increasing the elastic limit of the metal next surrounding the bore, and then press-fitting an axle in said bore with a pressure in excess of the original elastic limit of the metal and less than the elastic limit of the metal stressed in the preceding operation.

2. The process which consists in taking a metal wheel with a bore in the hub thereof, forcing through said bore a plug of circular section and of large enough diameter to stress the metal next surrounding said bore beyond the elastic limit thereof, thereby increasing the elastic limit of the metal thus stressed, and then press-fitting an axle in said bore with a pressure greater than the original elastic limit of the wheel metal but less than the elastic limit of the metal stressed in the preceding operation.

3. The process which consists in taking a cast steel locomotive wheel of relatively coarse texture and low yield point, increasing the elastic limit of the metal next surrounding the bore of the wheel by forcing through the bore a plug of circular section and of large enough diameter to stress the metal next surrounding said bore beyond the elastic limit thereof so as to increase the elastic limit of the metal thus stressed and then press-fitting an axle in said bore with a pressure greater than the original elastic limit of the wheel metal but less than the elastic limit of the metal stressed in the preceding operation.

4. A locomotive wheel and axle assembly comprising a cast steel locomotive wheel of relatively coarse texture and an axle press-fitted in its bore, the portion of the wheel metal next to the bore thereof having a higher yield point than the rest of the wheel metal, due to pressure thereon, prior to such press-fitting, in substantial excess of its original yield point, the pressure between said axle and said bore being greater than the elastic limit of the main body of the wheel metal but less than the elastic limit of the metal next to the bore.

OSCAR J. HORGER.